United States Patent
Truong et al.

(10) Patent No.: US 7,948,651 B2
(45) Date of Patent: May 24, 2011

(54) NON-SEQUENTIAL TRANSFER OF PDF DATA FOR PDF DIRECT PRINTING

(75) Inventors: Duc Phu Truong, West Covina, CA (US); Kenneth David Hayber, Fountain Valley, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 1092 days.

(21) Appl. No.: 11/681,138

(22) Filed: Mar. 1, 2007

(65) Prior Publication Data

US 2008/0212138 A1    Sep. 4, 2008

(51) Int. Cl.
*G06F 15/00* (2006.01)
*G06F 3/12* (2006.01)
(52) U.S. Cl. ........................ 358/1.6; 358/1.15
(58) Field of Classification Search ............... 358/1.1, 358/1.9, 1.13, 1.14, 1.15, 1.18; 715/206
See application file for complete search history.

(56) References Cited

U.S. PATENT DOCUMENTS

| | | | | |
|---|---|---|---|---|
| 6,067,553 | A * | 5/2000 | Downs et al. | 715/206 |
| 6,100,998 | A * | 8/2000 | Nagao et al. | 358/1.9 |
| 6,327,044 | B1 * | 12/2001 | Shima | 358/1.15 |
| 6,407,821 | B1 | 6/2002 | Hohensee et al. | |
| 6,538,760 | B1 * | 3/2003 | deBry et al. | 358/1.15 |
| 6,908,175 | B2 * | 6/2005 | Kikuta et al. | 347/41 |
| 6,914,692 | B1 * | 7/2005 | Mitani | 358/1.15 |
| 2004/0098410 | A1 | 5/2004 | Ozawa | |
| 2004/0143794 | A1 | 7/2004 | Sugimoto et al. | |
| 2005/0203919 | A1 | 9/2005 | Deutsch et al. | |
| 2007/0024885 | A1 | 2/2007 | Kim | |

* cited by examiner

*Primary Examiner* — Gabriel I Garcia
(74) *Attorney, Agent, or Firm* — Chen Yoshimura LLP (57) ABSTRACT

In a PDF direct printing method, an intelligent parser is provided on the client computer to parse out and transfer to the printer blocks of PDF data in an order in which the data will be used by the PDF rendering process of the printer. The directory information block of the PDF file is transferred first, and the printer can start the rendering process soon after the directory information block is received, before the entire PDF file is transferred to the printer. The blocks of PDF data are stored on the printer, and the memory locations of the blocks of data stored on the printer are recorded in a memory allocation database. The PDF rendering process of the printer accesses the memory allocation database to obtain the memory location of the block of PDF data it will need next for rendering, and retrieves that block of data for processing.

18 Claims, 6 Drawing Sheets

NON-SEQUENTIAL TRANSFER OF PDF DATA FOR PDF DIRECT PRINTING

BACKGROUND OF THE INVENTION

1. Field of the Invention

This invention relates to direct printing of a file of a certain description language, such as a PDF file, and in particular, it relates to a PDF direct printing method and apparatus that employs non-sequential transfer of PDF direct print data from a client computer to a printer controller.

2. Description of Related Art

Figure 1:
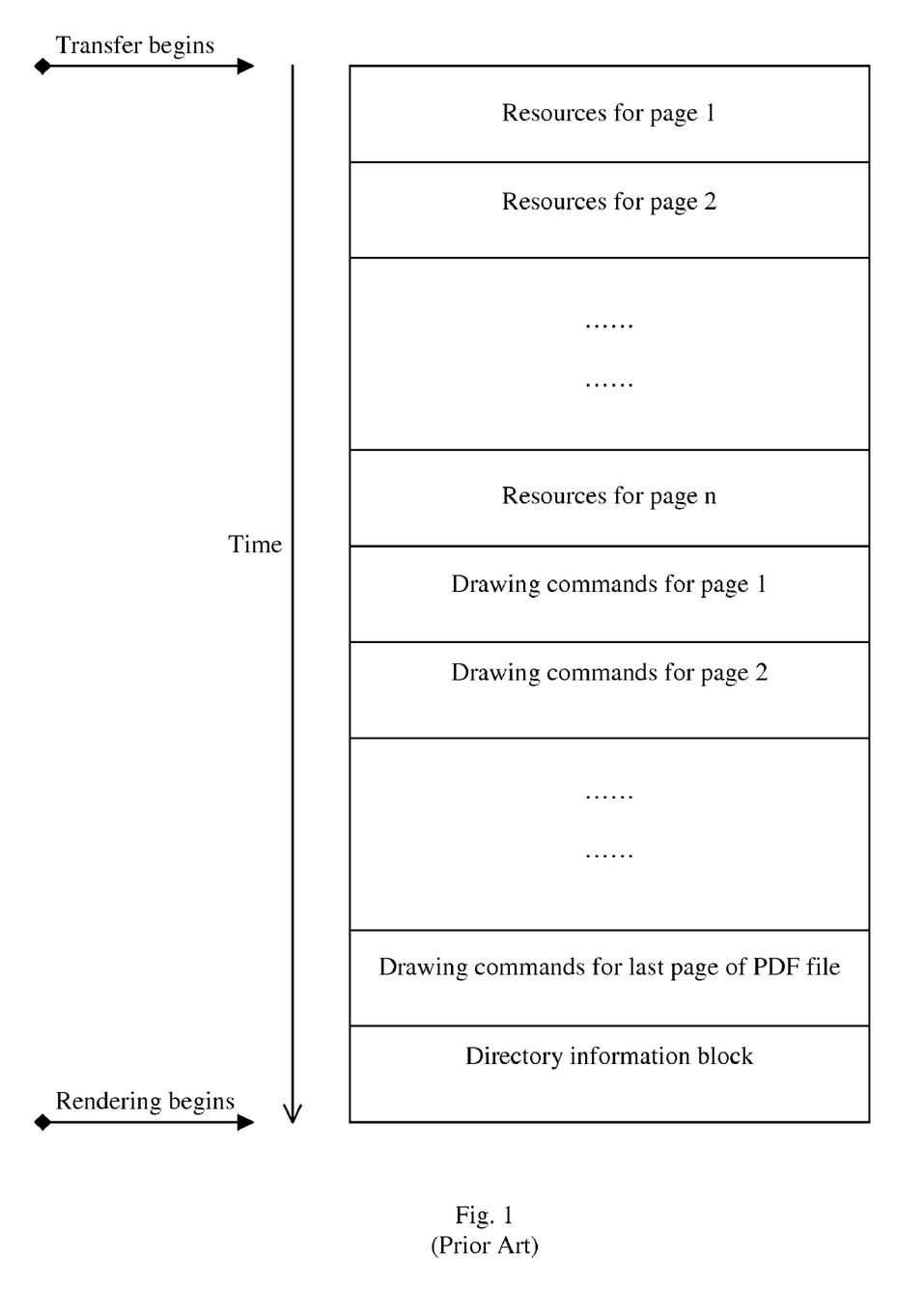
FIG. 1 schematically illustrates a data transfer timing sequence in a conventional PDF direct printing method.

PDF direct printing is a process by which a PDF (Portable Document Format) file is sent directly to a compatible printer device without first using an application or print driver to pre-process the PDF data into a traditional print language such as PDL (Page Description Language). PDF direct printing has the advantage of improved speed and/or quality of output. However, the nature of PDF files (the arrangement of data within the file) typically requires that the entire PDF file be transferred and saved on the printer controller (such as on a hard disk or flash drive accessible by the printer controller) before any image rendering process can begin. While the content of PDF files may be organized in any order, typical PDF files are organized such that the directory of objects within the PDF file (pages, fonts, images, etc) is found at the end of the file. This is often done because it makes writing a PDF file simpler for the application that creates the file. This organization causes the PDF direct print process to require that the entire file be downloaded so that this directory can be found and processed. Without access to the directory the PDF file cannot be printed. As shown in FIG. 1, which illustrates a timing sequence for data transfer according to conventional PDF direct printing methods, the resources for page 1 through page n (n being the total number of pages in the PDF file) are transferred in that order, and then drawing commands for page 1 through page n are transferred in that order. Because of its location within the PDF file, the directory information block is transferred after the commands and resources blocks. Resources are data that used by the PDF renderer (interpreter) during the PDF rendering (interpretation) process, such as font data embedded in the PDF file (referred to as downloaded fonts), etc. As shown in FIG. 1, the rendering process starts after the entire PDF file, including all of the resources and commands as well as the directory information block, has been transferred and received by the printer. This results in a delay in the time for the first page to be printed ("first page out time", or FPOT) and possibly an increase in overall print time, especially if the PDF file is large.

Various alternative methods have been described for PDF direct printing. One method employs an intermediate conversion process of reordering PDF resources and commands, and transmitting the converted PDF file to the printer. The converted PDF file will be printed faster than the original PDF file because data and resources for each page are "linearized" so that the printer can interpret it on the fly without waiting for the whole file to be transferred to the printer side. An example of this type of system is described in U.S. Pat. No. 6,407,821, where a conversion program residing on a print server is used to perform such conversion. Although such a method improves the overall PDF direct print in many cases, it has two disadvantages. First, it is a two-pass process where in the first pass the data is transferred from client to print server, and in the second pass the data is transferred from the print server to the printer. This means the data transmission time could be doubled. Second, it involves additional hardware (e.g. a print server) that performs the conversion task.

In another PDF direct printing method, described in U.S. Patent Publication 2004/0098410, the client extracts the cross-reference table (i.e. the directory information block) and the trailer portion of the PDF file, which is typically located at the end of the file, and transmits them to the printer first. Then, the printer analyzes the information in the cross-reference table and the trailer, and generates requests to the client regarding which part of the PDF file it needs next. In response thereto, the client transmits the requested part of the PDF file to the printer.

SUMMARY

The present invention is directed to a method and apparatus for direct printing of PDF or other file that substantially obviates one or more of the problems due to limitations and disadvantages of the related art.

An object of the present invention is to improve the performance of PDF direct printing.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for transferring data of a file from a client computer for direct printing by a printer connected to the client computer, the file including a plurality of blocks of data, the method including, on the client computer, (a) parsing out a directory information block from the file; (b) transferring the directory information block to the printer; (c) parsing the file according to page order information to obtain a next block of data that will be processed next by a rendering process, the page order information indicating at least a next page of the file to be printed; (d) transferring the next block of data to the printer; and (e) repeating steps (c) and (d) until all blocks of data in the file are transferred to the printer. The method further includes, on the printer, (f) receiving blocks of data from the client computer; (g) storing the received block of data in a memory; and (h) recording memory locations where the blocks of data are stored in a memory allocation database; (i) determining a next block of data to be processed for rendering; (j) accessing the memory allocation database to obtain a memory location for the next block of data to be processed; (k) retrieving the next block of data to be processed from the memory location; (l) processing the retrieved block of data; and (m) repeating steps (i) to (l) until all blocks of data transferred from the client are processed.

In another aspect, the present invention provides computer program products that cause a data processing apparatus to perform the above methods.

In yet another aspect, the present invention provides a data processing system comprising a client computer, wherein the client computer includes a parser section for parsing a file which includes a plurality of blocks of data, the parser section (a) parsing out a directory information block from the file, (b) transferring the directory information block, (c) parsing the file according to page order information to obtain a next block of data that will be processed next by a rendering process, the page order information indicating at least a next page of the file to be printed, (d) transferring the next block of data, and (e) repeating steps (c) and (d) until all blocks of data in the file are transferred. The data processing system further comprises a printer connected to the client computer, wherein the printer includes a database module for receiving blocks of data transferred from the client computer and storing the received blocks of data in a memory, and a memory allocation database for recording memory locations where the blocks of data are stored in. The printer further comprises a rendering module for (i) determining a next block of data to be processed for rendering, (j) accessing the memory allocation database to obtain a memory location for the next block of data to be processed, (k) retrieving the next block of data to be processed from the memory location, and (l) processing the retrieved block of data.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a PDF direct printing method that does not require the PDF file to be fully transferred from the client to the printer controller before rendering can start. Further, the method is a one-pass process that does not require a conversion of the PDF file to be performed before transmitting the PDF data to the printer. This is accomplished by the use of an intelligent PDF parser on the client side, which functions to intelligently transfer appropriate blocks of data within the PDF file to the printer in the appropriate sequence, rather than transferring blocks of PDF data sequentially in the order in which the blocks are originally arranged in the PDF file. Preferably, but not always required, the printer controller and the client communicate in a bidirectional manner during the data transfer to further ensure optimum transfer sequence of the PDF data in the file.

Figure 2:
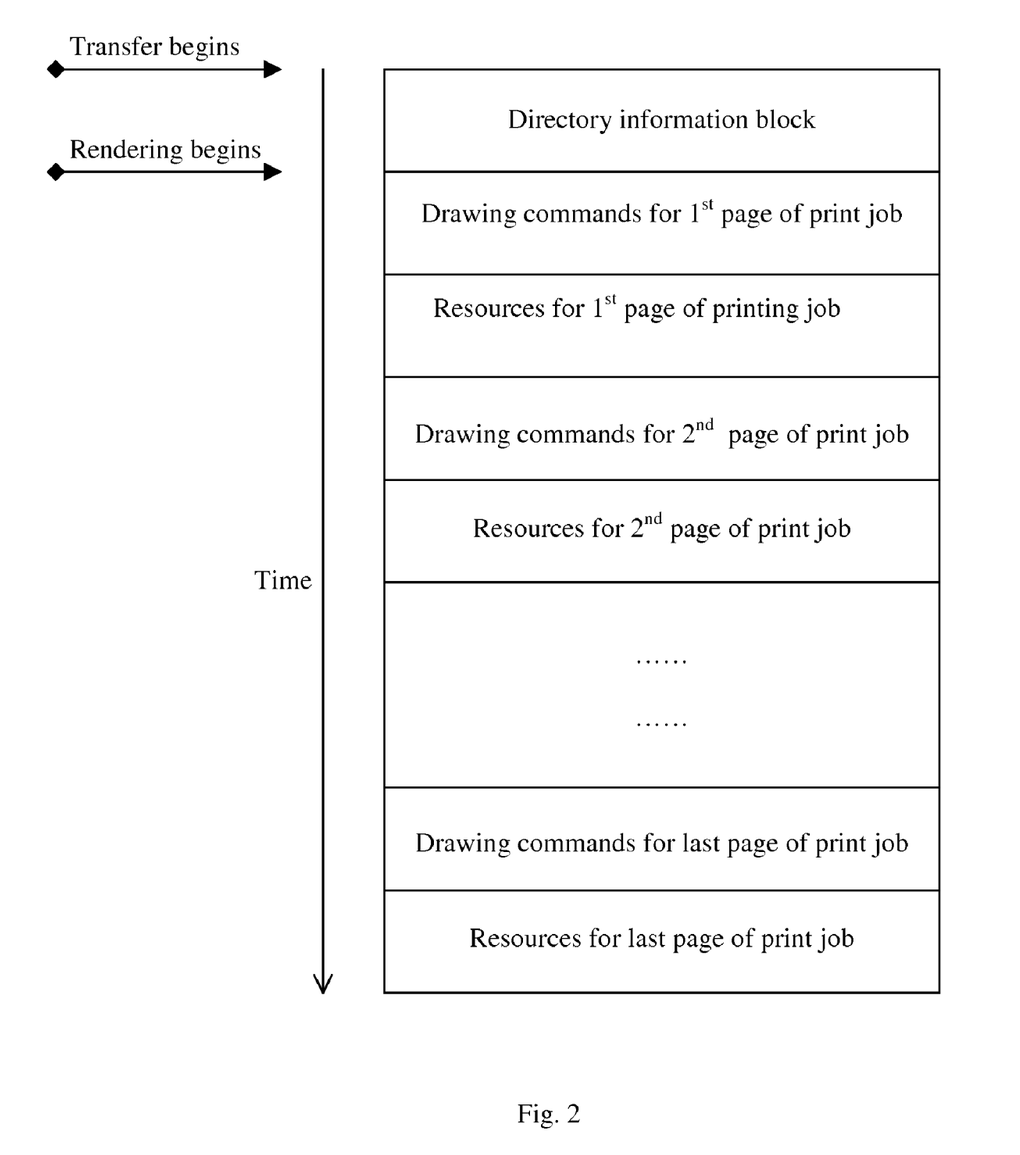
FIG. 2 schematically illustrates a data transfer timing sequence in a PDF direct printing method according to an embodiment of the present invention.

FIG. 2 illustrates a timing sequence for data transfer of a PDF direct printing method according to embodiments of the present invention. As shown in FIG. 2, the directory information block of the PDF file is transferred from the client first. The directory information block includes, for example, information regarding the offset from beginning of PDF file of each resource or command that graphically represents drawing objects within that PDF file. Note that even when a resource is used by many commands, it is only recorded once in the directory information block. The PDF rendering process begins some time soon after the directory information block has been transferred. As described in more detail later, because the PDF parser on the client can anticipate what PDF data the rendering process will need first and will transfer that data first, the rendering process can start as soon as sufficient data is received. This is typically before all the data for the first page is transferred. This is different from the prior art method shown in FIG. 1, where the printer controller waits for the entire PDF file to be transferred before starting the PDF rendering process. As a result, by employing the data transfer method according to embodiments of the present invention, the first page out time is significantly reduced, and the overall printing time may also be reduced.

Note that in FIG. 2, the first, second, etc. page of the print job are the pages within the document to be printed first, second, etc. according to a desired page order of the print job (i.e. which pages of the PDF file are to be printed in what order). Thus, they may or may not be the first, second, etc. pages of the document itself.

Figure 3:
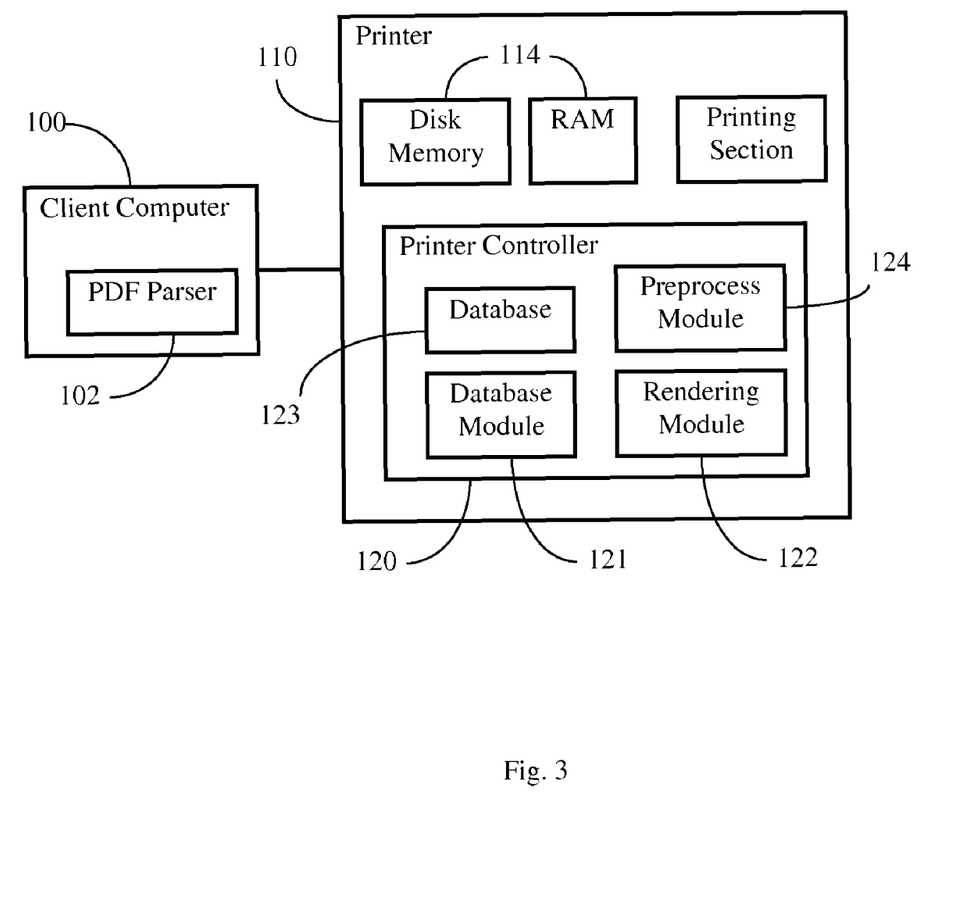
FIG. 3 schematically illustrates a client and printer system according to an embodiment of the present invention.

FIG. 3 schematically illustrates a system including a client computer 100 connected to a printer 110 according to an embodiment of the present invention. The client computer 100 initiates direct printing of a PDF file stored thereon, but does not use an application or print driver on the client to interpret the PDF data. The client computer 100 includes an intelligent PDF parser 102 which transfers PDF data in the file on the client side to the printer 110. The PDF parser 102 has knowledge of how the contents of the PDF file are structured within that file and can anticipate the order in which the blocks of PDF data, such as resources and commands, will be needed by the rendering process. The parser then parses out the appropriate blocks of PDF data and transfers them to the printer 110 in the appropriate order. The PDF parser 102 also keeps track of what PDF data has already been transferred to the printer. A printer controller 120 of the printer 110 includes a PDF rendering module 122 for interpreting (rendering) PDF data, such as performing PDF to PostScript conversion and/or raster processing to generate bitmap image data. The printer controller 120 also includes a database module 121 that keeps track of the location where each block of the PDF direct print data received from the client is stored on the printer. The database module 121 serves as a bridge between the PDF parser 102 on client side and the PDF rendering module 122 of the printer controller. When a block of PDF direct print data is transferred from the client 100 to the printer controller 120, the database module 121 stores the block of data in a memory 114 of the printer (e.g. a RAM and/or a hard disk, collectively referred to as the memory) and records the memory location where the block is stored in a memory allocation database 123. The PDF rendering module 122 determines what PDF data it needs next for the rendering process, accesses the memory allocation database 123 to obtain the memory location of that data, and retrieves the data from the memory 114 at that location.

When the entire PDF file is to be printed in the normal page order, i.e., from the first page to the last page of the document, the PDF parser 102 will be able to parse the PDF data and transfer it to the printer in the appropriate sequence without receiving any additional information from the printer 110. Bi-directional communication between the client 100 and the printer 110 is not necessary for the rendering process in such a situation. In some other situations, on the other hand, the PDF parser 102 may receive additional information from the printer controller 120 regarding the print job to ensure that the parser 102 transfers the PDF data in the optimum order. One example is when the print job specifies a particular page order for printing. For example, instead of printing all pages, the print job may specify that pages 1-3, 7 and 10 are printed in that order. Further, in some instances, neither the printer nor the client has knowledge of the complete page order before the job starts. In such instances, the printer controller 120 will transmit the page order information to the PDF parser 102, and the PDF parser 102 will parse and transfer the PDF data according to the page order. The page order information may include the page order for the entire file, or it may include the next page or pages to be printed. The PDF parser will achieve optimum transfer order so long as it is informed of the page number of the next page to be printed. Thus, unlike conventional PDF direct printing processes, in which the entire PDF file is transferred even though only a subset of the pages will be printed, the method according to embodiments of the present invention avoids transferring unnecessary PDF data. When no particular page order is specified, the PDF parser 102 will parse the PDF data according to a normal page order. The tasks of ascertaining the page order and communicating with the PDF parser 102 is performed by a preprocess module 124 of the printer controller 120.

The parser 102 on the client may be implemented using any suitable PDF parser program, including the Adobe® PDF parsing library and open source PDF parsing libraries such as XPDF or GhostScript. Preferably but not required, the PDF parser 102 uses a parsing algorithm that is substantially identical to the parsing algorithm used by the PDF rendering module 122 on the printer so that the parser can accurately predict the sequence of the PDF data that will be needed by the rendering module. Different PDF parsing algorithms may generate slightly different transfer orders, such as the order of resources and commands for each page, but such differences typically do not impact the overall rendering performance. Because the data transfer by the parser 102 will typically be faster than the PDF rendering process by the rendering module 122, by the time the rendering module processes a new page, the resources and commands for that page will most likely have been transferred to the printer already.

The rendering module 122 may be implemented by modifying existing PDF interpretation libraries of PDF rendering software to work with the new way in which the PDF direct print data is stored on the printer controller. As described earlier, a memory allocation database 123 is maintained by the printer controller 120 to record the memory locations where the various blocks of PDF data are stored. The rendering module 122 determines what PDF data it needs next for the rendering process (e.g., a particular resource), accesses the memory allocation database 123 to obtain the memory location of that data, and retrieves the data from the memory 114 at that location. In a conventional PDF rendering process, the entire PDF file (having blocks of data in its original order within the file) is stored in the printer, and the rendering module determines the location within the stored PDF file of the data it needs next and retrieve the data from the PDF file. To implement the rendering module 122 according to embodiments of the present invention, existing PDF interpretation libraries may be modified at the source code level by making necessary source code changes and recompiling the PDF library. Alternatively, modifications may be made at the object code level by intercepting file access functions of the existing PDF interpretation library that retrieve PDF direct print data and redirecting them to new functions which will access the memory allocation database 123 and communicate with the PDF parser 102 on the client when appropriate.

Figure 4:
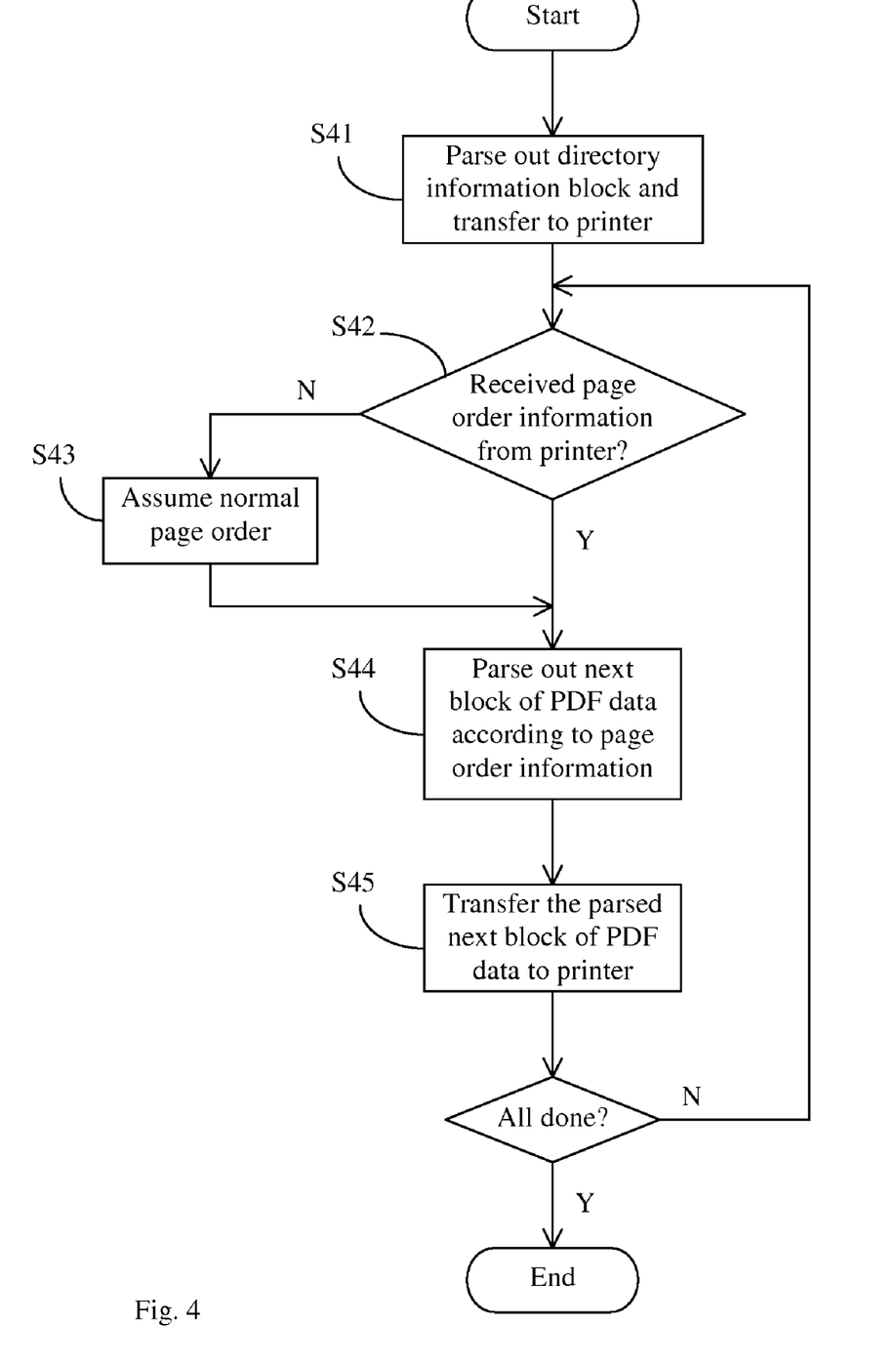
FIG. 4 illustrates a PDF data parsing and transferring process executed by the PDF parser on the client computer according to an embodiment of the present invention.

The processes executed by the parser 102, the database module 121 and the rendering module 122 are next described with reference to the flow charts FIGS. 4-6. FIG. 4 illustrates a PDF data parsing and transferring process executed by the PDF parser 102 on the client computer 100. After the PDF direct printing is initiated, the parser first parses out the directory information block from the PDF file and transfers it to the printer 100 (step S41). The parser continuously monitors any information received from the printer, including page order information, or any other information that may affect the desired sequence of transfer of the PDF direct print data. One example of such information is an "abort page" command. If no specific page order information has been received from the printer, the parser assumes a normal page order (i.e. to print from the first page to the last page) (steps S42 and S43). Based on the page order information (either specific page order information received from the printer, or a normal page order), the parser then parses out the next block of PDF data (step S44) and transfers it to the printer (step S45). As described earlier, the parsing algorithm may be implemented using any suitable PDF parsing library. This process (steps S42 to S45) is repeated until the entire PDF file is processed and transferred to the printer.

Figure 5:
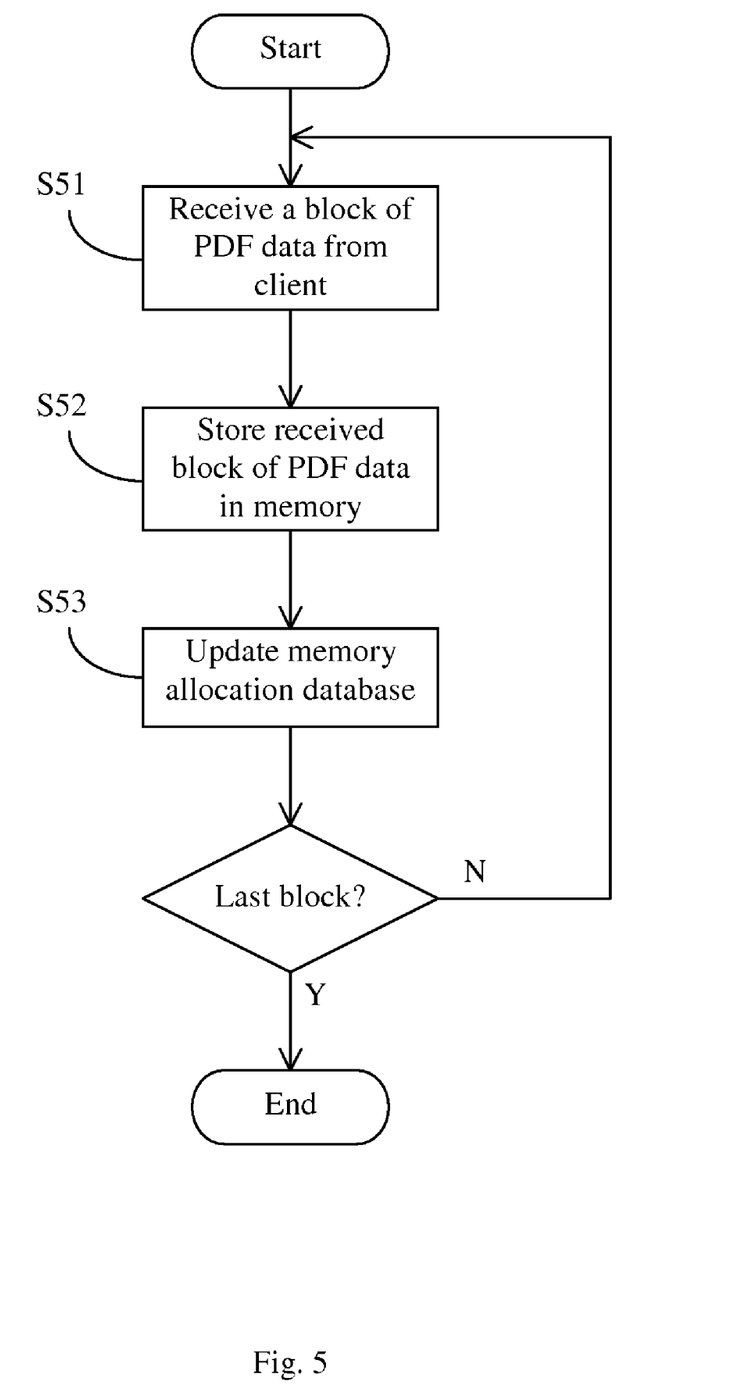
FIG. 5 illustrates a data storing process executed by the database module of the printer controller according to another embodiment of the present invention.

FIG. 5 illustrates a data storing process executed by the database module 121 of the printer controller 120. After receiving a block of PDF data from the client (step S51), the database module stores the received block of data in the memory 114 (step S52) and updates the memory allocation database 123 by recording the memory location where the block of data is stored (step S53). This process (steps S51 to S53) is repeated until the entire PDF file has been received.

Figure 6:
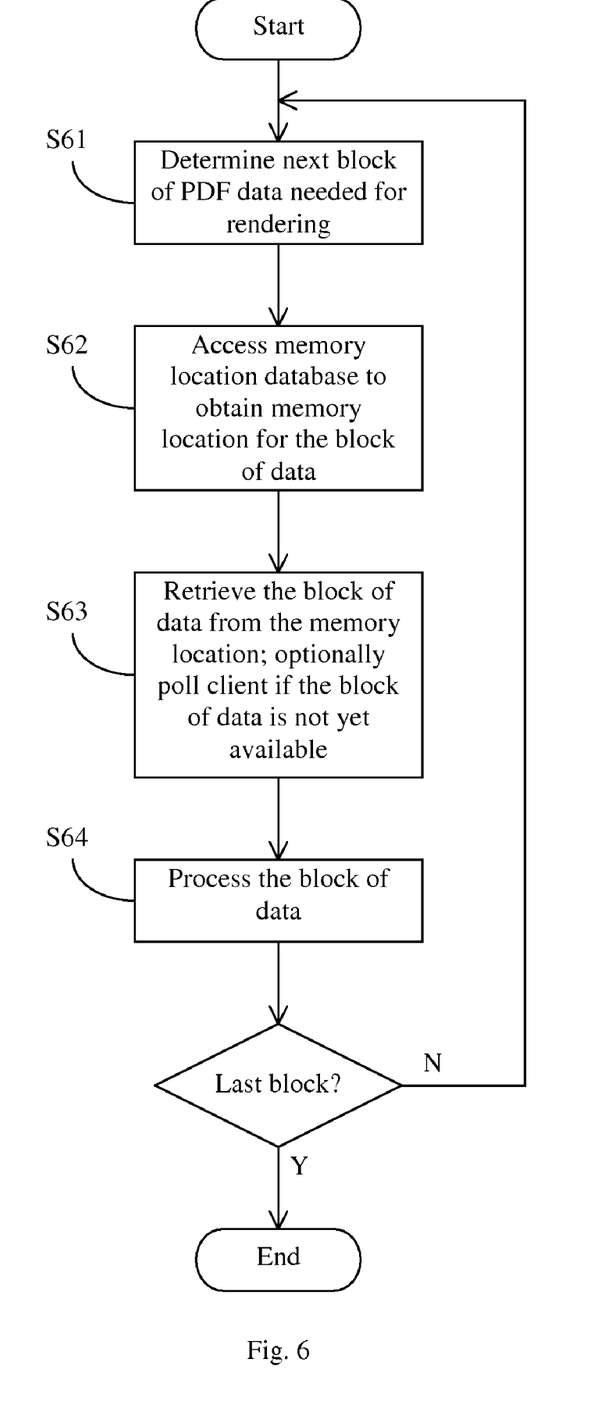
FIG. 6 illustrates a rendering process executed by the PDF rendering module of the printer controller according to another embodiment of the present invention.

FIG. 6 illustrates a rendering process executed by the PDF rendering module 122 of the printer controller 120. After the rendering process is initiated, the rendering module determines the next block of PDF data it needs for rendering (step S61). The directory information block (which has already been transferred to the printer) may be referred to in making this determination. The rendering module then accesses the memory allocation database 123 to obtain the memory location of the needed block of PDF data (step S62). Because of the use of the intelligent PDF parser 102 on the client, the needed block of data likely has already been transferred to the printer and stored in the memory 114 by the database module 121. After obtaining the memory location, the rendering module retrieves the needed block of data from the memory 114 (step S63). If the data has not been transferred from the client yet (e.g., the memory allocation database does not contain the memory location information for this block), then the rendering module may wait until the data is transferred, or it may poll the client for the needed data (step S62A). The rendering module then processes the block of data retrieved from the memory (or polled from the client) (i.e. interpreting the commands or using the resources contained in the block) (step S64). This process (steps S61 to S64) is repeated until the entire PDF file has been rendered. Although not illustrated in the flow chart, when appropriate, the rendering module transmits page order information to the parser 102 as described earlier.

The data transfer method described above may be adapted to generate a linearized version the original PDF on the client side. A linearized PDF file is a PDF file that is organized such that the directory information appears early in the file. Drawing commands and all resources needed for page 1 of the document appear after the directory information and before the other pages. A linearized PDF format allows the first page of the document to be rendered quickly, before the entire PDF file is transferred from the client. The format is sometimes also referred to as "fast web view" because it makes online viewing of PDF files within a web browser much faster. In the PDF direct printing method according to embodiments of the present invention described earlier, after the entire PDF file is transferred to the printer side, the PDF data is stored in the memory 114 of the printer, and the database 123 contains information regarding the storage locations of each block of the PDF data. Thus, if desired, a linearized PDF file can be easily generated from the stored data. To do this, a new PDF file is opened, and a module of the printer controller 120 writes the components of the PDF data to the file in accordance with the sequence and format defined for linearized PDF files. The directory information is re-written as well. Optionally, the PDF linearization process may occur concurrently with the PDF printing process. In particular, on a multi-core CPU system, one CPU core may be dedicated to the linearization task. The resulting linearized PDF file can be used for reprinting the document by the printer controller, or for fast viewing of the document on a monitor associated with the printer controller. This is useful in particular on command workstations where from time to time it is desirable to view and edit a PDF document and re-print it.

The data transfer method described above may also be used in spooling the PDF direct print job when the printer is busy printing another print job. The spooled file is stored on the printer to be printed when the printer becomes free. Spooling is advantageous because it frees the client computer so that it is not tied up to the printer when the printer is busy. Using the data transfer method described above, blocks of PDF data are transferred from the client (the parser) in the order in which they will be used by the PDF rendering process. The printer stores the blocks of PDF data in the received order, and the database module 121 records in the memory allocation database 123 the memory locations where the blocks of data are stored. The PDF direct data and the memory allocation database are stored until the printer is free to render the data. The spooled PDF data may be stored all on the hard disk of the printer as is conventionally done, or the spooled PDF direct data may be partly stored in the RAM and partly store in the hard disk using a method described in a commonly owned, co-pending U.S. patent application entitled "Direct Printing Method Using RAM Storage for Spooled Printer Files."

As seen from the above descriptions, the provision of the intelligent PDF parser 102 on the client allows the rendering module 122 of the printer controller to interpret the PDF direct print data "on the fly." In other words, this invention allows the rendering module 122 to process partial PDF data available on the controller side while the rest of the PDF direct print data of the print job is still on the client side. This improves the first page out time as well as the overall printing time.

Although direct printing of PDF documents are used as an example in the above descriptions, the method is not limited to PDF direct printing. The method can be applied to direct printing of other kinds of documents, especially the types of document that require an interpreter to access the document in a non-sequential fashion.

It will be apparent to those skilled in the art that various modification and variations can be made in the direct printing method and apparatus of the present invention without departing from the spirit or scope of the invention. Thus, it is intended that the present invention cover modifications and variations that come within the scope of the appended claims and their equivalents.

What is claimed is:

1. A method for transferring data of a file from a client computer for direct printing by a printer connected to the client computer, the file including a plurality of blocks of data and a directory information block, the method comprising:
   on the client computer,
   (a) parsing out the directory information block from the file, wherein the directory information block contains information regarding locations of all resources and commands that graphically represents drawing objects in the file;
   (b) transferring the directory information block to the printer;
   (c) parsing the file according to page order information to obtain a next block of data that will be processed next by a rendering process, the page order information indicating at least a next page of the file to be printed;
   (d) transferring the next block of data to the printer; and
   (e) repeating steps (c) and (d) to transfer a plurality of blocks of data in the file to the printer, wherein steps (a) and (b) are performed before steps (c) and (d), and wherein at least some of the blocks of data obtained in step (c) and transferred in step (d) contain at least some of the resources and commands.

2. The method of claim 1, further comprising:
   receiving the page order information from the printer.

3. The method of claim 1, wherein the page order information indicates a sequential printing order from a first page to a last page of the file.

4. The method of claim 1, further comprising:
   on the printer,
   (f) receiving blocks of data from the client computer;
   (g) storing the received blocks of data in a memory; and
   (h) recording memory locations where the blocks of data are stored in a memory allocation database.

5. The method of claim 4, further comprising:
   on the printer,
   (i) determining a next block of data to be processed for rendering;
   (j) accessing the memory allocation database to obtain a memory location for the next block of data to be processed;
   (k) retrieving the next block of data to be processed from the memory location;
   (l) processing the retrieved block of data; and
   (m) repeating steps (i) to (l) until all blocks of data transferred from the client are processed.

6. The method of claim 4, further comprising:
   on the printer,
   transmitting the page order information to the client computer.

7. The method of claim 1, wherein the file is a PDF (Portable Document Format) file, wherein the directory information block is located at the end of the file.

8. A non-transitory computer-readable medium having a computer readable code embodied therein for controlling a data processing apparatus including a client computer and a printer connected thereto, the computer readable program code comprising code configured to cause the client computer to execute a client process for transferring data of a file from the client computer for direct printing by the printer, the file including a plurality of blocks of data and a directory information block, the client process comprising the steps of:
   (a) parsing out the directory information block from the file, wherein the directory information block contains information regarding locations of all resources and commands that graphically represents drawing objects in the file;
   (b) transferring the directory information block to the printer;
   (c) parsing the file according to page order information to obtain a next block of data that will be processed next by a rendering process, the page order information indicating at least a next page of the file to be printed;
   (d) transferring the next block of data to the printer; and
   (e) repeating steps (c) and (d) to transfer a plurality of blocks of data in the file to the printer, wherein steps (a) and (b) are performed before steps (c) and (d), and wherein at least some of the blocks of data obtained in step (c) and transferred in step (d) contain at least some of the resources and commands.

9. The non-transitory computer-readable medium of claim 8, wherein the client process further comprises:
receiving the page order information from the printer.

10. The non-transitory computer-readable medium of claim 8, wherein the page order information indicates a sequential printing order from a first page to a last page of the file.

11. The non-transitory computer-readable medium of claim 8, the computer readable program code further comprising code configured to cause the printer to execute a printer process for processing the received data, the printer process comprising:
(f) receiving blocks of data from the client computer;
(g) storing the received blocks of data in a memory; and
(h) recording memory locations where the blocks of data are stored in a memory allocation database.

12. The non-transitory computer-readable medium of claim 11, wherein the printer process further comprises:
(i) determining a next block of data to be processed for rendering;
(j) accessing the memory allocation database to obtain a memory location for the next block of data to be processed;
(k) retrieving the next block of data to be processed from the memory location;
(l) processing the retrieved block of data; and
(m) repeating steps (i) to (l) until all blocks of data transferred from the client are processed.

13. The non-transitory computer-readable medium of claim 11, wherein the printer process further comprises:
transmitting the page order information to the client computer.

14. The non-transitory computer-readable medium of claim 8, wherein the file is a PDF (Portable Document Format) file, wherein the directory information block is located at the end of the file.

15. A data processing system comprising a client computer, wherein the client computer includes a parser section for parsing a file which includes a plurality of blocks of data and a directory information block, the parser section (a) parsing out the directory information block from the file, wherein the directory information block contains information regarding locations of all resources and commands that graphically represents drawing objects in the file, (b) transferring the directory information block, (c) parsing the file according to page order information to obtain a next block of data that will be processed next by a rendering process, the page order information indicating at least a next page of the file to be printed, (d) transferring the next block of data, and (e) repeating steps (c) and (d) to transfer a plurality of blocks of data in the file, wherein steps (a) and (b) are performed before steps (c) and (d), and wherein at least some of the blocks of data obtained in step (c) and transferred in step (d) contain at least some of the resources and commands.

16. The data processing system of claim 15, further comprising a printer connected to the client computer, wherein the printer includes:
a database module for receiving blocks of data transferred from the client computer and storing the received blocks of data in a memory; and
a memory allocation database for recording memory locations where the blocks of data are stored in.

17. The data processing system of claim 16, wherein the printer further comprises a rendering module for (i) determining a next block of data to be processed for rendering, (j) accessing the memory allocation database to obtain a memory location for the next block of data to be processed, (k) retrieving the next block of data to be processed from the memory location, and (l) processing the retrieved block of data.

18. The data processing system of claim 15, wherein the file is a PDF (Portable Document Format) file, wherein the directory information block is located at the end of the file.

* * * * *